3,233,011
METHODS OF MAKING A POROUS CONCRETE STRUCTURE
Fredrik Wilhelm Anton Kurz, Nysatravagen 12, Lidingo, Sweden, and Sverre Wikne, Salhus pr. Bergen, Norway
Filed Apr. 4, 1962, Ser. No. 184,916
Claims priority, application Sweden, Apr. 6, 1961, 3,603/61; Mar. 16, 1962, 2,972/62
2 Claims. (Cl. 264—13)

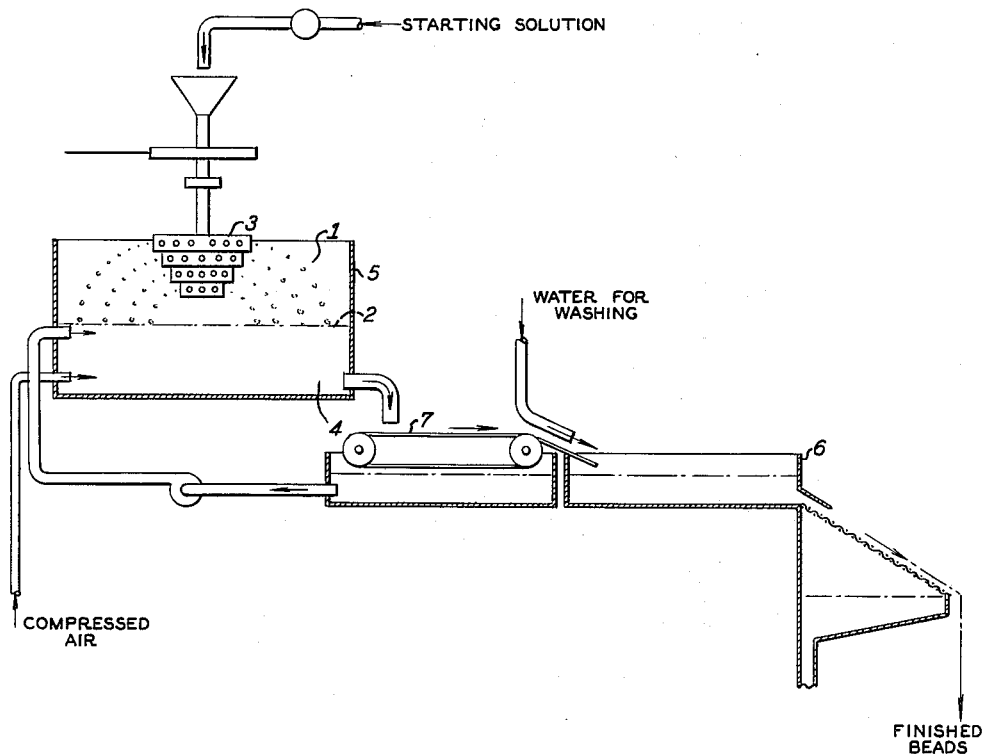

The present invention relates to a method of making a porous structure in which a pore-forming agent is added to a plastic material such as concrete, in order to render the same porous.

The pore-forming agent prepared in accordance with the present invention consists of small, essentially spherical beads which consist mainly of an aqueous gel or are in the form of a thin film of gel surrounding water or a mixture of water and air. These beads will be homogeneously admixed with the material which is to be rendered porous, such that after a period of time the beads dry out leaving pores, while only the dried collapsed remainder which has very slight weight and mass remains.

It has been suggested to prepare such beads by extruding an aqueous solution of a gel-forming substance as small droplets into a hardening bath of a composition such as to cause the gel-forming substance to be precipitated or coagulated so that it forms a thin superficial film enclosing a droplet of water or the entire droplet forms an aqueous gel. The beads are then separated from the hardening bath and are then supposed to be ready to be used for the intended purpose.

It has been found, however, that by this known method wherein the droplets of the aqueous solution of gel-forming substance are introduced immediately or practically immediately upon their formation into the coagulating bath, it is impossible to obtain spherical beads of uniform configuration and size, but only irregularly shaped beads will be formed.

A porous material has the advantage of smaller weight and better insulating capacity, but is of course less strong, in particular in compression than a solid material. It is therefore important that the pores be of such shape that they withstand a high pressure. This is the case only if the pores and therefore the pore-forming beads are nearly spherical.

It is also important for the gel beads to be spherical in order to resist stresses developed during admixture with substances such as cement and sand.

The main object of the present invention is to provide a process whereby beads of the above general type are added to a concrete mass together with a pore forming agent to render the mass porous, said beads being prepared in a manner such as to allow a more accurate control of the size and configuration thereof. In particular the object of this invention is to provide a process wherein there are added to a concrete mass a pore forming agent and spherical beads of uniform size in which the size of the beads can be readily controlled.

In accordance therewith, the present invention comprises preforming a solution of a gel-forming substance into essentially spherical particles in air, gas or other prehardening medium and thereupon introducing said spherical particles into a hardening bath so as to form beads of nearly perfect spherical configuration. Thereafter, the beads are admixed with a pore forming agent in a fluid concrete mass to produce a structure containing larger pores formed by the evaporated beads and smaller pores formed by the pore forming agent.

The gel-forming substance may be, for example alginic acid or a salt thereof, and the hardening bath then consists suitably of an aqueous solution of a calcium salt, such as calicum chloride, calcium hydroxide etc. When the particles of alginic acid or alginate contact the calcium salt solution, calcium alignate will be precipitated as a film, so that the beads are formed, or the whole particle is penetrated, the ions forming soluble salts being replaced by calcium ions forming an insoluble alginic acid salt, whereby the beads become strong and resistant. Other gel-forming substances which may be used are generally high-molecular weight organic substances which are soluble to form viscous solutions in water or aqueous liquids but can be precipitated or coagulated by the addition of suitable chemicals. Examples include water-soluble and alkali-soluble cellulose derivatives, such as carboxymethylcellulose, methylcellulose, hydroxyethylcellulose, viscose, further agar, caseinates, bone glue, starch and gums, e.g. mannogalactans, xylans, lactans, tamarind gum, guar gum, locust beam gum, dextroses, polyvinyl alcohol and others. The hardening bath to be used will of course depend on which gel-forming substance is used. As examples may be mentioned alum for carboxymethylcellulose, sulphuric acid for viscose, borax or lead acetate for mannogalactans, optionally combined with other salts, glyoxal for all substances containing hydroxyl or carboxyl groups, such as starches, dextran, pectins, CMC etc. Many gel-forming substances and suitable hardening baths therefor will readily suggest themselves to those skilled in the art, and since the present invention is not primarily concerned with the composition of the beads, but relates to the manipulative steps of carrying the process into practice, it is not deemed necessary to discuss in detail the composition of the gel-forming substance and the coagulating bath.

The invention will be described with respect to the attached drawing wherein the sole figure is a diagrammatic view of apparatus adapted for performing the process according to the invention.

To obtain the gel beads, it is of importance as above stated that the solution be preformed in air, gas or other suitable inert medium 1 into spherical droplets before they are contacted with the coagulating bath 2. This preforming consists in the formation of such small particles of the order of 0.1 to 8 mms. of the viscous solution (having a high water content, the solution having generally a content of the gel-forming substance of about 0.1–5%, preferably 1%) that these particles as they pass through a short distance in air or other suitable medium on account of the surface tension form small spheres of predetermined size.

This preforming operation may be carried out for example by filling the viscous starting solution into a container the bottom of which has small orifices of a size correspond to that which is desired in the beads, which orifices may have short downwardly directed tubular nozzles. A condition for the formation of suitable particles which are formed into small spherical beads when they pass through the air, gas or other suitable medium 1, by the surface tension is that a suitably low pressure is maintained by keeping the liquid level in the vessel substantially constant at a rather low level by continuous or intermittently controlled supply of liquid thereto. The pressure head above the orifices must be adapted to the viscosity by controlled self-pressure or air pressure. If the pressure is too high, no particles are preformed, which are transformed into beads, but in contrast lumps or filaments are formed; if the pressure is too low the colloidal solution will not flow through the openings. Another way of preforming spherical particles is by centrifugation (horizontally or vertically) or extrusion or spraying with suitable spraying devices under a low reduced pressure so that on leaving the spraying nozzle no dust is formed but suitable particles are formed which become spherical by surface tension.

These preformed particles are then introduced by gravity action or through other suitable movement through the air or a gaseous medium, which latter may have a pre-hardening action as an alternative the particles may be introduced under the influence of a slight air pressure or the like through a medium suitable for droplet formation (which may have a coagulating action) into the hardening liquid which has such an action on the colloidal substance that the skin becomes sufficiently hard and resilient to withstand the stresses upon admixture of the beads with the concrete, whereby the small beads will be uniformly distributed in the concrete and after some time dry and leave pores while only the dried skin or residue which has insignificant weight and mass remains.

Preforming in air or other suitable medium is of principal importance, because if the viscous solution is subdivided into particles directly in the hardening bath without particular measures, which enables the surface tension to act and to form spherical beads, only uncontrollable lumps would be formed, which could also cause frequent interruptions of the production for cleaning the nozzles. The gel beads are only useful in practice if they are substantially spherical because only then can they withstand the high pressure during admixture with the material to be rendered porous. If the droplets retain the form of lumps or elongated drops which they first obtain in the subsequent hardening step, they are not well suited for their purpose. Not just drops of any varying shape are required, but essentially spherical beads. Also, the size of the beads must be controlled, so that it is possible to add either particles of exactly the same size to the material which is to be made porous or to add a mixture of beads of two or more sizes in predetermined proportions. It was found, that larger pores impart a greater compression strength than very small pores, since there is more matrix material between the pores. By incorporating very small pores between the larger pores, the insulating action can be improved without reducing the compression strength to a significant degree. This mixture is very important for its insulating property. Therefore a mixture of macroscopic cavities produced by evaporation of gel beads and microscopic cells produced by evaporation of added water is a desired combination in a accumulator mass.

It is well known that a droplet of a viscous solution having a diameter of about 1.5 millimeters (1/16 inch needs to drop about 2 meters (6 feet) in order that the surface tension shall have time to eliminate non-sphericity. Such a long distance between the vessel containing the solution of the gel-forming substance and the hardening bath is hardly feasible in industrial production. This is still more important if the velocity is higher than in a free fall by gravity, e.g. when the droplets are expelled by centrifugation. Particular means and operative steps are necessary to shorten this distance or the time for the action of the surface tension or by special steps to retard the movement from the vessel containing the pre-hardening solution to the hardening bath.

As an example of pre-forming, the present invention contemplates a centrifugating container 3 having rotary perforate drums. The beads are ejected from the drums of the container 3 and are deposited into a hardening bath 4 contained in a vessel 5.

In this case, however, it is important to furnish means which facilitates the formation of the spherical shape of the beads and not to rely only on the automatic initiation.

Such means may consist in providing the perforations with tubular outlets, having sharp edges at their ends, which edges facilitate disengagement and thereby accelerate the formation of spheres. These perforations or tubes may have such a shape or direction that while accelerating the formation of spheres, they decelerate the velocity of the droplets between the container and the hardening bath, whereby the droplets have more time to become spherical by surface tension.

It is also of importance to insure that the droplets are not shattered by a too high velocity or a too acute angle of impingement on the hardening bath. By causing the vessel 5 containing the hardening bath to rotate around the centrifuging container 3 with the solution, the surface of the hardening bath can be lowered centrally, whereby the container 3 can also be lowered toward the hardening bath and the angle of impingement in the hardening bath reduced.

Other means of retarding the movement of the beads from the container to the hardening bath include causing passage through neutral media (gases or liquids) which are immiscible with the hardening bath, e.g., $CCl_4$. In these neutral media, the droplets have an opportunity of becoming spherical.

Furthermore, chemical agents can be added which accelerate the action of the surface tension.

It is also mentioned above that performing can be effected in gases having a pre-hardening action. Such media, as for example, vapors of formalin, can also be used to give the beads a stronger skin. It has further been found that not only can gases have such a prehardening effect but that liquids also may have such a prehardening effect. If, for example, a solution of mannogalactans, guar gum, etc., is dropped into a prehardening bath such as borax or basic lead acetate, soft irregular particles are formed which become firm and spherical when they are transferred to a hardening bath of calcium hydroxide.

Furthermore, it has been found that the hardened beads, in spite of all the precautionary measures mentioned above sometimes have difficulty in becoming spherical or that after some time they lose their spherical shape or their durability. The reason is that impurities or salts were either present in the gel-forming material or are derived from the hardening bath. It is therefore of primary importance that these impurities and salts be removed. If this were to be effected in the gel-forming material, it would be too expensive. To do it in the hardening bath is practically impossible. It is possible, however, to remove all undesirable constituents by thorough washing of the beads in a washing device 6 to which the beads are conveyed from the vessel 5 by the conveyor 7. By the washing of the beads only the essential ingredients which are chemically bound in the gel beads remain while foreign undesirable substances which are not bound, are removed. Beads in which these chiefly inorganic impurities are present have an inner slightly harder core, while the outer layer is aqueous and gives off water at the slightest touch. This makes the beads unusable for the intended purposes.

It has further been found that beads made from a viscose solution as well as from solutions of other materials if they contain impurities, have a tendency of becoming flat during hardening, because the hardening liquid needs some time to form a skin around the beads. The beads will then lie on the surface of the bath and become flat. By adding water absorbing agents, e.g. kieselguhr, bentonite or the like, to the solution or the hardening bath, the absorption power of the beads is increased and the hardening liquid is taken up in a better way, whereby the beads become spherical.

As pore-forming agents these beads have considerable advantages as compared to hitherto used pore-forming agents. These known methods form pores by evolution of gas (e.g. aluminum powder) or by foaming. In such cases one obtains a more brittle structure, the size, proportion and distribution of the pores of which cannot be predetermined in advance and large pores are not obtainable. There appears an uncontrollable evolution of the pore system. According to the present invention it is possible to select the size and number of pores and thereby these factors can be determined in advance and thus it is possible to select and vary the bulk density compression strength and insulating action of the porous material. When using a gas-evolving or foaming agent, a useful final product can often be obtained only by steam hardening, while according to this invention it is not necessary to use the expensive steam-hardening step, even though this is not excluded in the method. It is also possible to combine the use of the spherical beads with gas-evolving or foaming agents, if it is desirable to add very small pores to the larger pores. The pores are not changed during setting of the porous material, while gas-evolution and foaming continue during setting and thereby render the structure more porous.

While porous materials which are formed by the aid of gas-evolution or foaming can only be made prefabricated, the pore-forming agent prepared in accordance with this invention can be added to the material to be rendered porous, at the location of ultimate use, e.g. in casting porous concrete directly at the building site. In this manner, one is not limited to small elements but can prepare large surfaces without joints, e.g. floors etc. Wetting the freshly cast concrete is not necessary with this system since evaporation of the great amount of water in the embedded beads keeps the material sufficiently moist during setting and prevents too rapid drying. For the same reason, it is often not necessary to add water to the concrete whereby the work is simpler and cleaner.

The advantage of the gel beads is that a considerably greater amount of water can be added, since the gel beads begin to evaporate only after the concrete has set whereby the walls between the cavities will be strong and form a strong skeleton. This strong skeleton also prevents the porous material from expanding or shrinking during setting. Concrete has a tendency of shrinking during setting, which is reduced by the gel beads uniformly dispersed in the concrete body, which causes the volume to be maintained.

It is also possible to add fillers or extenders such as glass fiber, asbestos, kieselguhr, bentonite, perlite, etc. to render the porous material more resilient and improve the tensile or bending strength. Porous hard materials are generally less resilient in thin layers and this disadvantage can be reduced by reinforcement with glass fibers. These glass fibers, which may if desired be plastic-coated, cannot ordinarily be added to a gas-evolving or foaming material, but this is possible if the pores are fixed in advance and form a kind of skeleton so that the porous material cannot expand or shrink while it receives its final volume. Since the addition of glass fibers makes the material more elastic, it can be made still more porous, i.e. lighter and more insulating.

By impregnation with various substances, e.g. asphalt emulsions, hydrophobic agents, vinyl acetate, furfural or resorcinol resins, preferably of low viscosity types, alone or in combination with urea resins, water glass etc. which may be added to the colloidal solution prior to formation of the beads or to the coagulating bath, the final product can be improved so that it is rendered harder, water-repellent, absorbent or the like, as desired.

It is also possible to treat the gel beads with clay so as to form a thin clay skin around each bead. By firing the beads, it is then possible to obtain small hollow clay beads which are suitable for admixture with various materials.

We claim:

1. A method of manufacture of a large porous concrete structure comprising forming spherical beads of uniform size of between 0.1 and 8 mm. diameter consisting essentially of a hardened aqueous gel containing air and water by dropping globules of aqueous gel into a hardening medium after passage through a prehardening medium in which the globules assume a spherical shape and undergo preliminary hardening of the gel surface, the gel surface undergoing further and thorough hardening in the hardening medium, homogeneously admixing said beads together with a pore-forming agent selected from the group consisting of gas-evolving agents and foaming agents into a fluid concrete mass and permitting said concrete mass to set in situ with the beads uniformly distributed in said mass, said aqueous gel beads undergoing evaporation after setting of the mass to produce a structure comprising larger pores formed by the evaporated spherical beads and smaller pores formed by said pore-forming agent.

2. A method as claimed in claim 1, wherein said aqueout gel contains guar gum.

References Cited by the Examiner
UNITED STATES PATENTS

| | | | |
|---|---|---|---|
| 1,614,636 | 1/1927 | Wachtel. | |
| 2,439,772 | 4/1948 | Gow | 18—2.6 |
| 2,465,343 | 3/1949 | Battista | 18—47.2 XR |
| 2,541,165 | 2/1951 | Kulp. | |
| 2,572,998 | 10/1951 | Eisner | 18—2.7 |
| 2,786,772 | 3/1957 | Stewart et al. | 106—67 |
| 2,797,201 | 6/1957 | Veatch et al. | 18—47.2 XR |
| 2,806,509 | 9/1957 | Bozzacco et al. | 117—100 |
| 2,820,984 | 1/1958 | Spina et al. | 18—47.2 XR |
| 2,850,396 | 9/1958 | Fischer | 106—67 |
| 2,887,723 | 5/1959 | Hallie et al. | 18—47.2 XR |
| 2,996,389 | 8/1961 | Fernhof | 106—71 |
| 3,015,128 | 1/1962 | Somerville | 18—2.6 |
| 3,021,291 | 2/1962 | Thiessen | 106—97 |
| 3,027,266 | 3/1962 | Wikne | 18—47.2 XR |
| 3,104,196 | 9/1963 | Shannon | 117—100 |

ALEXANDER H. BROADMERKEL, *Primary Examiner.*

MICHAEL V. BRINDISI, MORRIS LIEBMAN, ALFRED L. LEAVITT, *Examiners.*